(12) United States Patent
Hammer et al.

(10) Patent No.: US 6,488,184 B2
(45) Date of Patent: Dec. 3, 2002

(54) DRY PARTICULATE DISPENSER

(75) Inventors: Donald J. Hammer, Red Wing, MN (US); Scott M. Harrison, Vadnais Heights, MN (US); Bruce H. Koerner, Red Wing, MN (US)

(73) Assignee: Schwan's Technology Group, Inc., Red Wing, MN (US)

( * ) Notice: Subject to any disclaimer, the term of this patent is extended or adjusted under 35 U.S.C. 154(b) by 0 days.

(21) Appl. No.: 09/738,406

(22) Filed: Dec. 15, 2000

(65) Prior Publication Data

US 2001/0030202 A1 Oct. 18, 2001

Related U.S. Application Data

(60) Provisional application No. 60/170,942, filed on Dec. 15, 1999.

(51) Int. Cl.$^7$ ................................................. G10F 11/18
(52) U.S. Cl. ..................... 222/361; 222/132; 222/135; 222/181.3; 222/561
(58) Field of Search ........................... 222/181.1, 181.3, 222/197, 200, 344, 444, 448, 453, 561, 361, 129, 132, 135, 362

(56) References Cited

U.S. PATENT DOCUMENTS

| 486,919 A | 11/1892 | Winget ........................ 220/543 |
|---|---|---|
| 4,346,802 A | * 8/1982 | Popper ........................ 198/533 |
| 4,403,715 A | 9/1983 | Ludovissie .................. 222/361 |
| 4,440,322 A | 4/1984 | Henry ......................... 222/153 |
| 4,531,658 A | 7/1985 | Galopin ...................... 222/181 |
| 4,562,941 A | * 1/1986 | Sanfilippo ................... 222/108 |
| 4,766,457 A | 8/1988 | Barker et al. .................. 355/3 |
| 5,421,491 A | 6/1995 | Tuvim et al. ............... 222/336 |
| 5,588,563 A | 12/1996 | Liu ............................. 222/158 |
| 5,730,333 A | 3/1998 | Baluk et al. ............. 222/181.3 |
| 5,772,086 A | 6/1998 | Krafft .......................... 222/438 |

* cited by examiner

Primary Examiner—Henry C. Yuen
Assistant Examiner—Patrick Buechner
(74) Attorney, Agent, or Firm—Westman, Champlin & Kelly, P.A.

(57) ABSTRACT

A dry mix particulate dispenser includes a container configured to hold a dry mix particulate. The container has a top portion, a bottom portion, and at least one side wall. The container includes a dispenser opening formed in the bottom portion and a sloped interior wall within the container is angled in a direction generally toward the opening. A slide track is positioned adjacent the bottom portion of the container receives an elongate slider. The slider including an opening formed therein which can be selectively aligned with the dispenser opening.

34 Claims, 6 Drawing Sheets

DRY PARTICULATE DISPENSER

The present application is based on and claims the benefit of U.S. provisional patent application Ser. No. 60/170,942, filed Dec. 15, 1999, the content of which is hereby incorporated by reference in its entirety.

BACKGROUND OF THE INVENTION

The present invention relates to dry particulate dispensers. More specifically, the present invention relates to dry particulate dispensers such as those used to dispense food products.

Dry particulates, such as cereal, salad toppings, peanuts, crushed cookies, candy pieces, "sprinkles", etc., are frequently used in food preparation. One simple technique for applying these toppings is to hold the various toppings in containers and then use a spoon to dispense the desired amount of a topping. However, this simple technique is not well suited for consumer food outlets such as salad bars, restaurants, ice cream shops, etc., which may experience high volume sales. Additionally, this simple technique does not provide accurate regulation in the amount of toppings dispensed and is prone to contamination.

Frequently, more sophisticated dispensers than the simple spoon method discussed above are used to dispense dry particulates. However, some dispensing methods do not provide accurate portion control and do not provide consistent product flow out of the dispenser. Such dispensers are frequently gravity fed in which gravity is used to draw the particulate from the dispenser. However, dispensers can have problems when dispensing a "tough flow" product which does not flow easily from the dispenser. Such a tough flow product tends to bridge or plug the dispenser opening. This plugging can cause the end user to under dispense which can cause the user to dispense again, resulting in an inconsistent product and causing higher costs due to waste in dispensing.

SUMMARY OF THE INVENTION

In one aspect, a dry mix particulate dispenser includes a container configured to hold a dry mix-particulate. The container has a top portion, a bottom portion, and at least one side wall. The container includes a dispenser opening formed in the bottom portion and a sloped interior wall within the container is angled in a direction generally toward the dispenser opening. A slide track is positioned adjacent the bottom portion of the container. An elongate slider is configured to be slidably received in the slide track. The slider including an opening formed therein which can be selectively aligned with the dispenser opening.

DETAILED DESCRIPTION OF THE PREFERRED EMBODIMENTS

Figure 1:
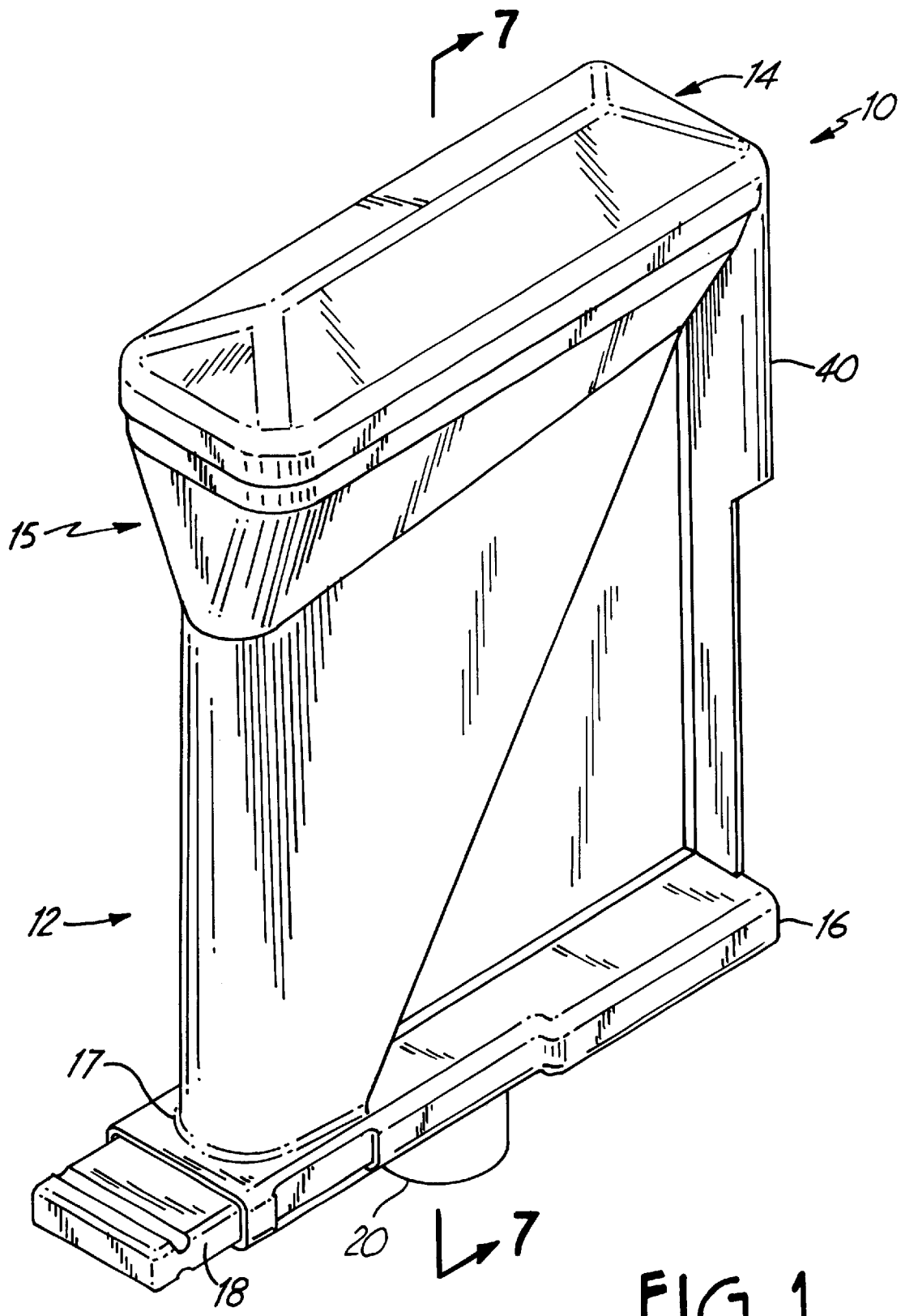
FIG. 1 is a front isometric view of a dry mix particulate dispenser in accordance with one embodiment.

FIG. 1 is a perspective view of a dry particulate dispenser 10 in accordance with one embodiment of the present invention. In one aspect, the configuration of dispenser 10 solves plugging issues related to operation, of gravity fed dispensers. Dispenser 10 includes a hopper body 12 which is covered by a lid 14 along a top portion 15. A slider track 16 extends along a bottom portion 17 of a hopper body 12. A slider 18, shown in more detail below, slidably fits in track 16 and is used for dispensing dry particulate. A spout 20 extends out of track 16. As discussed in more detail below, hopper body 12 is configured to hold a dry particulate which can be selectively dispensed by moving slider 18 in slider track 16.

Figure 2:
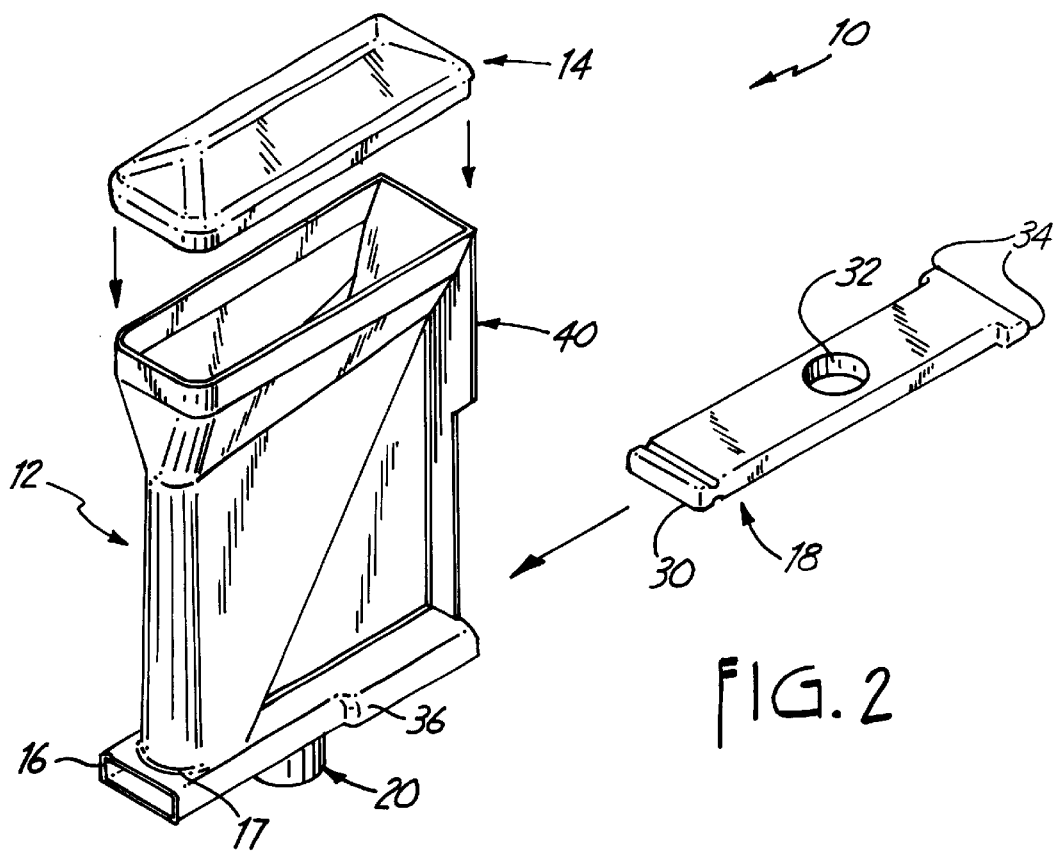
FIG. 2 is a isometric exploded view of the dispenser of FIG. 1.
Figure 3:
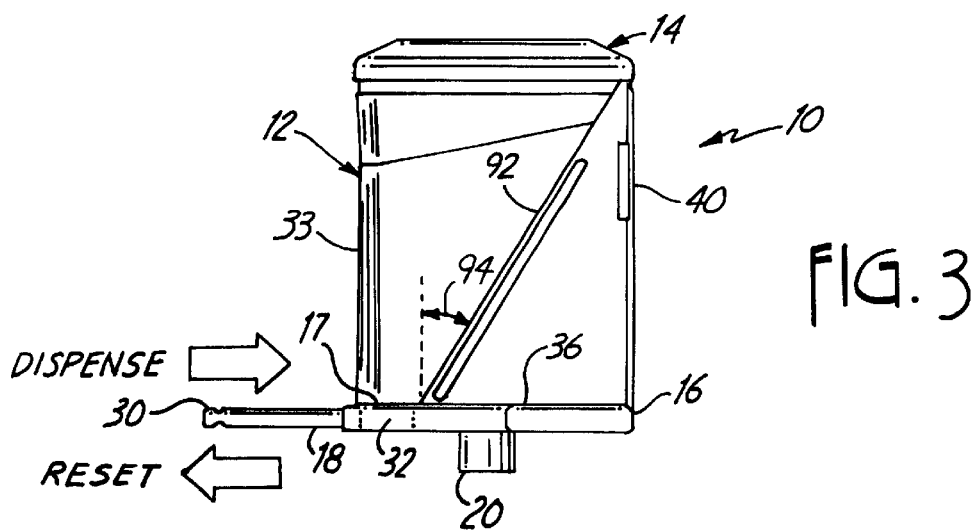
FIG. 3 is a side view of the dispenser of FIG. 1.

FIG. 2 is an exploded isometric view of dispenser 10 of FIG. 1. In FIG. 2 the placement of lid 14 over hopper body 12 can be seen. Similarly, slider 18 can be seen in more detail. Slider 18 includes a front handle portion 30, an opening 32 and back tabs 34. Back tabs 34 are configured to engage tab stops 36 to prevent further movement of slider 18 within track 16. This is more clearly illustrated in the side view of FIG. 3. FIG. 3 also shows a front wall 33 and a sloped back wall 92.

FIG. 3 also illustrates the movement of slider 18 within slider track 16. Slider 18 can be moved between a dispense and a reset position. In the reset position which is illustrated in FIG. 3, the opening 32 in slider 18 is aligned with an opening in the base of hopper body 12. In this position, gravity draws dry particulate into opening 32. As discussed below in more detail, the angled walls along with the vibrations caused by movement of the slider body encourage the flow of the particulate into opening 32. Slider 18 can then be pushed inward, into track 16 and into the dispense position in which opening 32 is aligned with spout 20. As opening 32 comes into alignment with spout 20, gravity draws the particulate from opening 32 and through spout 20. Preferably a cup or other object is positioned below spout 20 to receive the dispensed particulate.

Figures 4, 5:
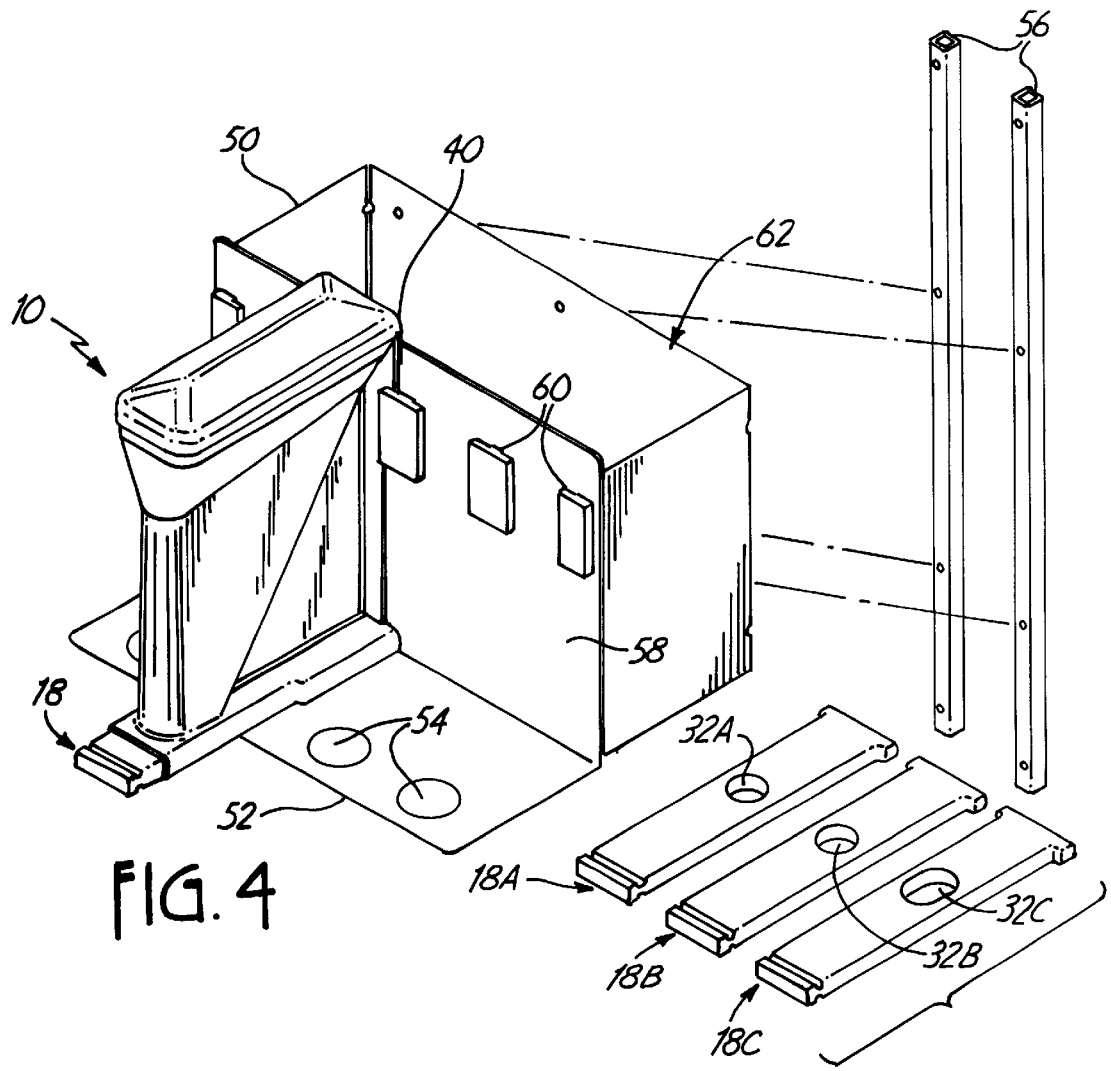
FIG. 4 is a perspective view of a dispenser and a bracket for holding a plurality of dispensers.
FIG. 5 shows an example of three different sliders for use with the dispenser of FIG. 1.

FIG. 4 is an exploded view of a hopper offset bracket 58 configured to carry a plurality of dispensers 10. In the embodiment of FIG. 4, offset bracket 58 is configured to hold four dispensers 10. Offset bracket 58 includes a support surface 52 configured to support the slider track 16 of dispenser 10 and having openings 54 formed therein configured to receive spouts 20 therethrough. Wall brackets 50 are provided for mounting on a wall and supporting hopper offset bracket 50. This attachment can be, for example, through screws or other attachment means. A back wall 58 configured to receive back wall tab 40 dispenser 10. Slider brackets 60 and 62 are mounted on back wall 58 and configured to slidably receive a back wall tab 40 of dispenser 10. As illustrated in FIG. 4, dispenser 10 can be slidably received between any two brackets 60, 62. Brackets 60, 62, back wall 58 and support surface 52 secure dispenser 10 within hopper offset bracket 58. The configuration illustrated in FIG. 4, provides an easy technique for using multiple dispensers 10 which the dispenser can be quickly moved from the bracket, cleaned or refilled. Additionally, the back wall 58 prevents removal of slider 18 from slider track 16 while dispenser is in use.

FIG. 5 shows three example sliders 18A, 18B and 18C having respectively larger openings 32A, 32B and 32C formed therein. Based upon the size of the particulate being dispensed from dispenser 10, an appropriately sized opening 32 can be chosen. For example, a small opening 32A is appropriate for a small diameter particulate whereas a large opening such as 32C is appropriate for larger diameter particulates such as cereal products, partially broken cookies, etc.

Figure 9:
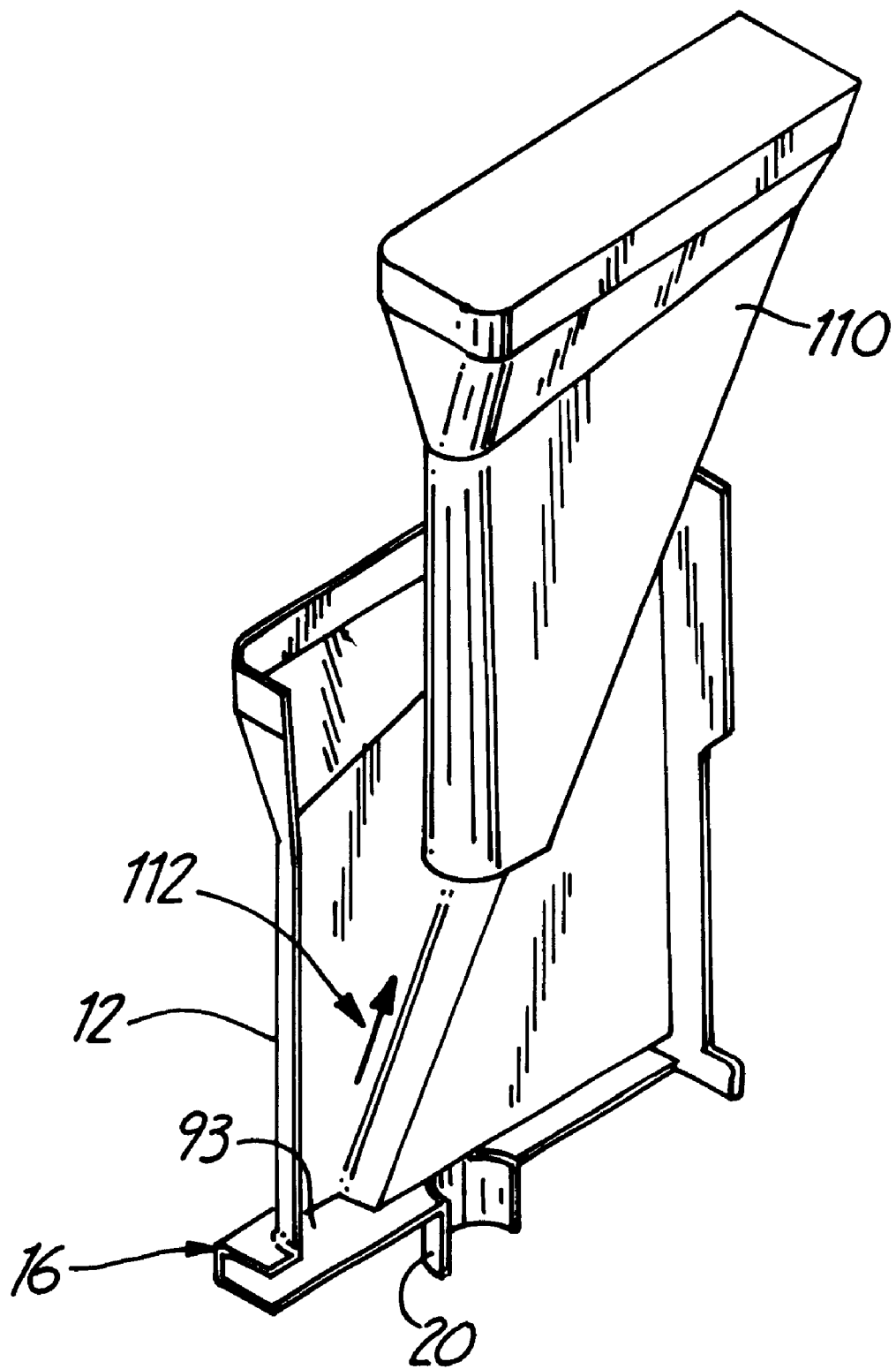
FIG. 9 is a cutaway view of the dispenser relative to a mold core used to fabricate a hopper body.

One aspect of the present invention includes the recognition that the particular configuration and angle of interior side walls can be selected to help promote particulate product flow, especially those products which have flow difficulty such as crushed cookies, through the hopper body 12. The desired flow characteristics can be achieved by selecting the appropriate compound angles on interior side walls of hopper body 12. In one aspect, hopper body 12 has interior side wall angles such that the wall spacing is wider at the bottom of the hopper body 12. As illustrated in FIG. 9 through the use of a compound taper facilitates a mold core to be removed from the body in an injection molding process. However, injection molding a single piece body 12 having a single dimensional taper that opposes removal of the core is difficult. In one aspect of the invention, a second angle is added to the interior of the hopper 12 such that a single piece core can be produced. As illustrated in FIG. 9, the core 110 can then be removed from the back of the hopper. This second angle preferably extends from the front portion of the hopper body 12 toward the back portion with the angle wider at the back and narrower at the front. In another aspect, the front portion around wall 33 of the hopper body 12 has a rounded or curved shape. This curvature also helps improve product flow. Preferably, when the slider 18 is in the "reset" position as illustrated in FIG. 3, the opening 32 is flush with the opening of the hopper body 12 to ensure a more consistent flow of the particulate product.

Figure 6:
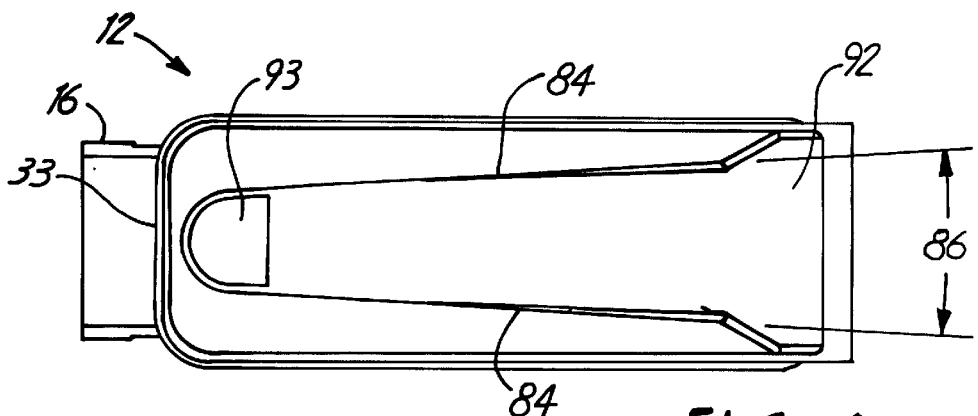
FIG. 6 is a top view of the dispenser of FIG. 1.

FIG. 6 is a top plan view of hopper body 12. In the Figure, the hopper body 12 is shown to include back wall 92 and front wall 33, which is positioned near a D-shaped opening 93 located in the bottom portion 17 of body 12 and side walls 84. Front wall 33 conforms to openings 93 and 32. An angle 86 between side walls 84 is shown in FIG. 6. Angle 86 is a front to back angle in the horizontal plane. The angle is relative to a vertical plane. In one preferred embodiment, half of this angle is about 7°. However, in one preferred range, half of this angle is between 4.7° and 8.0°. In another preferred range, half of angle 86 is between 2.0° and 5.8°. The angle of the individual side walls 84 relative to the length of the hopper is half these values. Preferably, this angle is selected to facilitate injection molding body 12 as a single unit.

Figure 7:
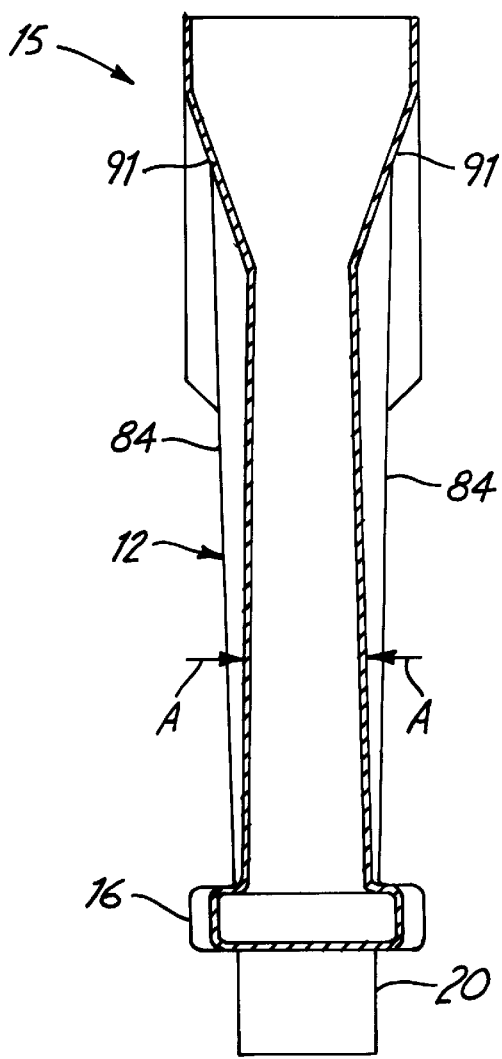
FIG. 7 is a cross-sectional view of the dispenser of FIG. 1 taken along the line labeled 7—7.

FIG. 7 is a front cross-sectional view of hopper body 12 along the line labeled 7—7 in FIG. 1. FIG. 7 shows an angle A between side walls 84 in a vertical plane, the angle is relative to a horizontal plane. In one preferred embodiment, angle A is about 2.0°. In another embodiment, angle A is between about 0° and 3.0°. In still another preferred embodiment, angle A is between about 2.0° and 5.0°. The angle of the individual side walls 84 relative to the height of the hopper are half these values. Angle A shown in FIG. 7 and angle 86 shown in FIG. 6 should be selected to achieve the desired flow of particulate through hopper 12. Angles 86 and A can be selected in any combination to achieve the desired flow for a particular dry particulate. The compound angles A and 86 provide good flow and allow hopper body 12 to be molded as a single unit.

Hopper body 12 also includes a sloped interior wall 92 which is angled toward opening 32. Wall 92 forms an angle 94 with a horizontal plane. Angle 94 is preferably 58°. However, in various preferred embodiments angle 94 is between about 45° and 60°, or between about 50° and 75°.

FIG. 7 also shows hopper top 91 which is formed in top portion 15 of hopper body 12 in greater detail. Hopper top is located on the top of hopper body 12 and provides a funnel shape to direct particulate into the angled interior portion of hopper body 12.

Figure 8:
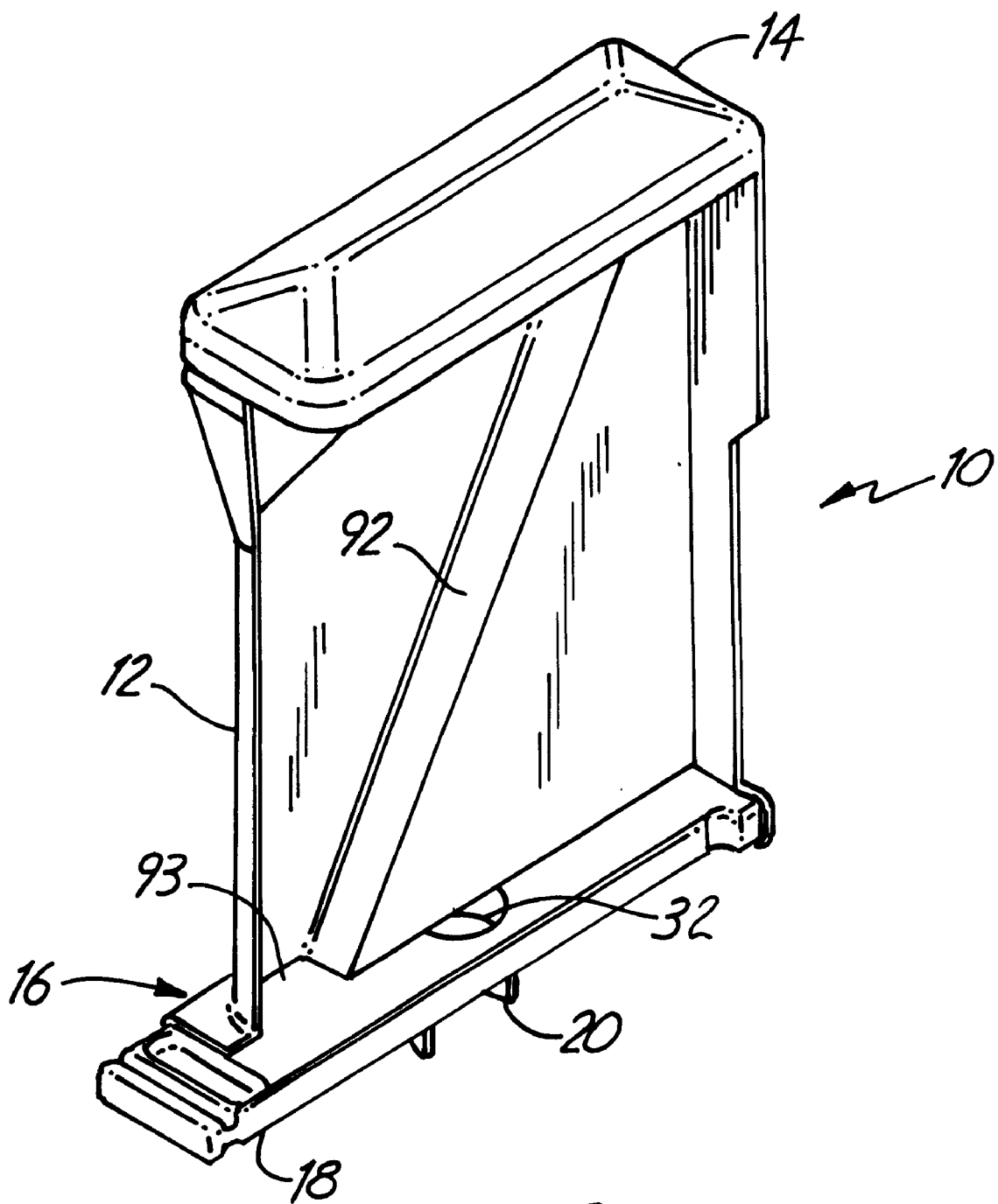
FIG. 8 is a cutaway view of the dispenser shown in FIG. 1.

FIG. 8 is a perspective cutaway view of dispenser 10. FIG. 8 more clearly shows opening 93 in hopper body 12. As illustrated, opening 93 has a front general "D" shape with a radius towards the front of hopper body 12. The front radius of opening 93 is generally configured to match the opening 32 in slider 18.

FIG. 9 shows a cutaway view of dispenser 10 and a mold core 110. FIG. 9 illustrates the molding process used to fabricate dispenser 10 and hopper body 12. Additionally, FIG. 9 illustrates how the compound angles facilitate the molding process. When using the injection molding to fabricate a body, the molded body cannot have any undercuts relative to the mold core. This configuration is achieved, along with the desired slope towards opening 93, in accordance with the present invention and through the use of a compound wall angle. The mold core 110 is to be removed from the molded hopper body 12 along a diagonal as illustrated by arrow 112. The core 110 cannot be extracted straight vertically due to the sloped walls.

The present dispenser provides a technique for dispensing dry particulate with reduced problems associated with bridging, improved portion control and reduced costs. Dispenser is easily produced and is easy to use with a variety of products. The motion of the slider 18 can also provide a thumping or a vibration which can act to move particulate into the slider opening. The curved front generally conforms to the curve of opening 32 to eliminate any interior ledge which could collect or trap product. Further, the curved wall is angled at preferably 1° from vertical to encourage product flow toward opening 32. Ranges for this angle include between 0° and 3.0° or between 2.0° and 5.0°. The angled walls are directed such that the product does not become wedged which can also cause bridging. The sliding dispensing compartment formed by its opening is preferably large enough to accept larger particulates along with fine particulates. When the particulate size exceeds the size of the opening of the dispenser, movement of the slider shears the large particulate without displacing product which is already in the dispensing compartment. The spout 20 also provide an extended outlet which is suitable for inserting into a cup to minimize waste. As the particulates do not bridge, and the dispensed amount is accurately placed in the desired location, the operator is less likely to double dispense thereby reducing waste. This helps create a more consistent tasting end product and at the same time reduces waste through over dispensing.

The hopper body is preferably made of the polycarbonate or a polypropylene for easy molding. The design preferably provides a large opening near the top for easy loading which also provides extra volume. The angled interior walls preferably blend into a curved front region. The slider track is preferably integral at the bottom of the hopper and contains the slider without requiring the use of additional tools to attach or remove the slider. This provides ease of use as well as ease in cleaning. Sliders having different sized openings can be used as desired for the particular product being dispensed. The lid can be easily attached the top to keep the product clean and fresh.

Although the present invention has been described with reference to preferred embodiments, workers skilled in the art will recognize that changes may be made in form and detail without departing from the spirit and scope of the invention. For example, the various angles, angle ranges, and configurations can be used in any combination. In one aspect, dispensers other than a slider in a slider track can be used.

What is claimed is:

1. A dry mix particulate dispenser, comprising:
   an integral molded container body configured to hold a dry mix particulate, the container having a top portion, bottom portion, a front wall, a back wall and two opposed side walls which extend between the back wall and the front wall;
   a container opening formed in the bottom portion and between the front wall back wall and two opposed side walls;
   the back wall extends from the top portion of the container toward the opening and is angled in a direction generally toward the opening in the bottom portion;
   the side walls extend from the top portion of the container away from the opening and are angled in a direction away from the opening in the bottom portion whereby the side walls are spaced closer together near the openings and further spaced apart near the top portion of the container; and
   wherein the side walls and back wall are angled to promote flow of dry particulate toward the opening and to promote a molding process used to form the container.

2. The dry mix particulate dispenser of claim 1 including:
   a slide track extending in a direction generally parallel with the bottom portion, the slide track positioned adjacent the bottom portion of the container; and
   an elongate slider configured to be slidably received in the slide track, the slider including a slider opening formed therein.

3. The dry mix particulate dispenser of claim 2 wherein the slider moves in the slide track moves between a fill position in which the slider opening is generally aligned with the container opening to thereby fill the slider opening with dry particulate and a dispense position in which the slider opening is aligned with a spout to thereby dispense the dry particulate from the slider opening.

4. The dry mix particulate dispenser of claim 2 wherein the slider includes a tab configured to engage a tab stop in the slide track.

5. The dry mix particulate dispenser of claim 3 wherein the spout is cylindrical.

6. The dry mix particulate dispenser of claim 1 wherein the container opening is partially circular.

7. The dry mix particulate dispenser of claim 1 wherein the front wall provides a curved interior wall of the container body which is configured to conform to the container opening.

8. The dry mix particulate dispenser of claim 7 wherein the container opening is partially circular and the curved interior wall has a cross section which is at least partially circular and conforms to the container opening.

9. The dry mix particulate dispenser of claim 1 wherein an angle of the side walls with a vertical plane is between about 2° and about 8°.

10. The dry mix particulate dispenser of claim 1 wherein an angle of the back wall with a vertical plane is about 58°.

11. The dry mix particulate dispenser of claim 1 wherein an angle of the side walls with a horizontal plane is between about 0° and about 2.5°.

12. The dry mix particulate dispenser of claim 1 wherein an angle of the side walls with a horizontal plane is about 1°.

13. The dry mix particulate dispenser of claim 1 including a mounting bracket configured to hold a plurality of integral molded container bodies.

14. The dry mix particulate dispenser of claim 13 wherein each container body includes a back wall tab configured to be slidably received in the mounting bracket.

15. The dry mix particulate dispenser of claim 1 including a hopper top configured to hold dry particulate and having a funnel shape to direct the dry particulate into an angled interior portion of the container body.

16. The dry mix particulate dispenser of claim 15 including a lid configured to cover the hopper top.

17. The dry mix particulate dispenser of claim 2 wherein movement of the slider causes vibration which promotes flow of dry particulate through the container opening.

18. A dry mix particulate dispenser, comprising:
    an integral molded container body configured to hold a dry mix particulate, the container having a top portion, bottom portion, a front wall, a back wall and two opposed side walls which extend between the back wall and the front wall;
    a curved container opening formed in the bottom portion;
    the back wall angled in a direction generally toward the opening in the bottom portion; and
    the front wall extending perpendicular from the bottom portion and curved along its width to conform to the container opening.

19. The dry mix particulate dispenser of claim 18 wherein the side walls and back wall are angled to promote flow of dry particulate toward the opening and to promote a molding process used to form the container.

20. The dry mix particulate dispenser of claim 18 including:
    a slide track extending in a direction generally parallel with the bottom portion, the slide track positioned adjacent the bottom portion of the container; and
    an elongate slider configured to be slidably received in the slide track, the slider including a slider opening formed therein.

21. The dry mix particulate dispenser of claim 20 wherein the slider moves in the slide track moves between a fill position in which the slider opening is generally aligned with the container opening to thereby fill the slider opening with dry particulate and a dispense position in which the slider opening is aligned with a spout to thereby dispense the dry particulate from the slider opening.

22. The dry mix particulate dispenser of claim 20 wherein the slider includes a tab configured to engage a tab stop in the slide track.

23. The dry mix particulate dispenser of claim 20 wherein the spout is cylindrical.

24. The dry mix particulate dispenser of claim 18 wherein the container opening is partially circular.

25. The dry mix particulate dispenser of claim 18 wherein the container opening is partially circular and the front wall has a cross section which is at least partially circular and conforms to the container opening.

26. The dry mix particulate dispenser of claim 18 wherein an angle of the side walls with a vertical plane is between about 2° and about 8°.

27. The dry mix particulate dispenser of claim 18 wherein an angle of the back wall with a vertical plane is about 58°.

28. The dry mix particulate dispenser of claim 18 wherein an angle of the side walls with a horizontal plane is between about 0° and about 2.5°.

29. The dry mix particulate dispenser of claim 18 wherein an angle of the side walls with a horizontal plane is about 1°.

30. The dry-mix particulate dispenser of claim 18 including a mounting bracket configured to hold a plurality of integral molded container bodies.

31. The dry mix particulate dispenser of claim 30 wherein each container body includes a back wall tab configured to be slidably received in the mounting bracket.

32. The dry mix particulate dispenser of claim 18 including a hopper top configured to hold dry particulate and having a funnel shape to direct the particulate into an angled interior portion of dry container body.

33. The dry mix particulate dispenser of claim 32 including a lid configured to cover the hopper top.

34. The dry mix particulate dispenser of claim 20 wherein movement of the slider causes vibration which promotes flow of dry particulate through the container opening.

* * * * *

UNITED STATES PATENT AND TRADEMARK OFFICE
CERTIFICATE OF CORRECTION

PATENT NO.    : 6,488,184 B2
DATED         : December 3, 2002
INVENTOR(S)   : Donald J. Hammer et al.

It is certified that error appears in the above-identified patent and that said Letters Patent is hereby corrected as shown below:

Column 5,
Line 19, after "front wall" insert -- , --.

Column 7,
Line 6, change "dry-mix" to -- dry mix --.

Column 8,
Line 4, change "dry" to -- the --.

Signed and Sealed this

Thirteenth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,488,184 B2
DATED         : December 3, 2002
INVENTOR(S)   : Donald J. Hammer et al.

It is certified that error appears in the above-identified patent and that said Letters Patent is hereby corrected as shown below:

Column 5,
Line 28, change "openings and further spaced" to -- opening and spaced further --.

Signed and Sealed this

Twenty-second Day of June, 2004

JON W. DUDAS
*Acting Director of the United States Patent and Trademark Office*